(12) United States Patent
Seliger

(10) Patent No.: US 8,292,988 B2
(45) Date of Patent: Oct. 23, 2012

(54) WASHING COLUMN WITH REDUCED STRUCTURAL HEIGHT

(75) Inventor: Andreas Seliger, München (DE)

(73) Assignee: Linde Aktiengesellschaft, Munich (DE)

( * ) Notice: Subject to any disclaimer, the term of this patent is extended or adjusted under 35 U.S.C. 154(b) by 531 days.

(21) Appl. No.: 12/444,195

(22) PCT Filed: Sep. 28, 2007

(86) PCT No.: PCT/EP2007/008489
§ 371 (c)(1),
(2), (4) Date: Dec. 7, 2009

(87) PCT Pub. No.: WO2008/043444
PCT Pub. Date: Apr. 17, 2008

(65) Prior Publication Data
US 2010/0101249 A1    Apr. 29, 2010

(30) Foreign Application Priority Data
Oct. 6, 2006 (DE) .......................... 10 2006 047 380

(51) Int. Cl.
*B01D 47/12* (2006.01)
*B01D 53/14* (2006.01)

(52) U.S. Cl. .................. 95/24; 95/199; 95/213; 95/223; 95/235; 95/236

(58) Field of Classification Search .................. 62/121, 62/311; 261/108; 95/213, 24, 199, 223, 95/235, 236
See application file for complete search history.

(56) References Cited

U.S. PATENT DOCUMENTS

| | | | | |
|---|---|---|---|---|
| 2,826,601 A | * | 3/1958 | Barsky | 558/351 |
| 2,845,444 A | * | 7/1958 | Thomson | 554/205 |
| 3,239,432 A | * | 3/1966 | Rhodes et al. | 202/160 |

(Continued)

FOREIGN PATENT DOCUMENTS

DE    1 494 808 A1    6/1969

(Continued)

OTHER PUBLICATIONS

International Search Report of PCT/EP2007/008489 (Jan. 21, 2008).

*Primary Examiner* — Duane Smith
*Assistant Examiner* — Ives Wu
(74) *Attorney, Agent, or Firm* — Millen, White, Zelano & Branigan, P.C.

(57) ABSTRACT

The invention relates to a washing column (T) for implementing a physical gas washing. Gas (1) is sent from the bottom to the top and washing agent (2) is sent from the top to the bottom through the washing column. At least two washing sections (WS1, WS2) are arranged on top of one another in the washing column (T). The top section (WS2) is bounded at the bottom by a riser base (K), from which a portion of the washing agent that is charged into the top washing section can be introduced as washing agent into the lower washing section (WS1). Another portion of the washing agent can be removed from the washing column (T) via a lateral drain (4). The top washing section (WS2) is connected to the lower washing section (WS1) by an overflow (U), via which charged washing agent from the riser base (K) can be introduced into the lower washing section (WS1).

8 Claims, 1 Drawing Sheet

U.S. PATENT DOCUMENTS

| | | | | |
|---|---|---|---|---|
| 3,531,917 | A | * | 10/1970 | Grunewald et al. ............ 95/174 |
| 3,899,312 | A | * | 8/1975 | Kruis et al. ..................... 62/625 |
| 3,922,326 | A | * | 11/1975 | Yoshida et al. ............... 261/113 |
| 3,985,523 | A | * | 10/1976 | Kaupas et al. .................. 95/193 |
| 4,089,752 | A | * | 5/1978 | Hancock, II .................... 203/99 |
| 4,118,285 | A | * | 10/1978 | Yeh ................................. 203/81 |
| 4,146,569 | A | * | 3/1979 | Giammarco et al. ......... 423/222 |
| 4,254,094 | A | * | 3/1981 | Hegarty ..................... 423/658.3 |
| 4,427,605 | A | * | 1/1984 | Meier et al. .................... 261/97 |
| 4,510,023 | A | * | 4/1985 | Bennett et al. .................. 203/99 |
| 5,185,017 | A | * | 2/1993 | Tanigawa et al. ............... 96/356 |
| 5,252,198 | A | * | 10/1993 | Harrison et al. .......... 208/208 R |
| 5,389,343 | A | * | 2/1995 | Gentry .......................... 422/605 |

FOREIGN PATENT DOCUMENTS

| | | |
|---|---|---|
| DE | 25 16 553 A1 | 11/1975 |
| DE | 80 19 449 U1 | 3/1981 |
| DE | 42 11 785 A1 | 10/1992 |

* cited by examiner

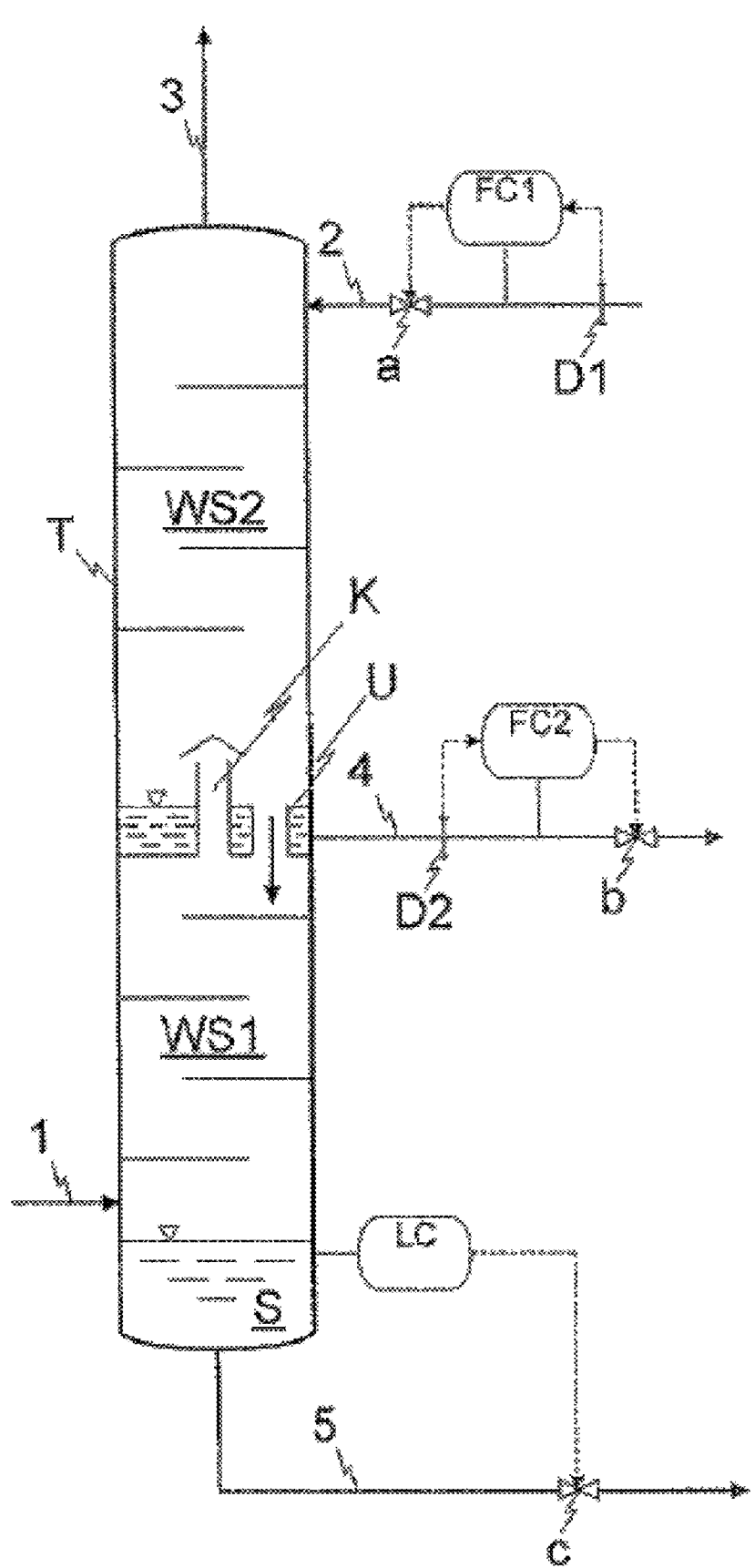

WASHING COLUMN WITH REDUCED STRUCTURAL HEIGHT

The invention relates to a washing column for implementing physical gas washing, in which gas is sent from the bottom to the top and washing agents are sent from the top to the bottom through the washing column, whereby at least two washing sections are arranged on top of one another in the washing column, the top section of which is bounded at the bottom by a riser base, from which a portion of the washing agent that is charged in the upper washing section can be introduced as washing agent into the lower washing section, and another portion can be removed from the washing column via a lateral drain, as well as a process for operating the washing column according to the invention.

Physical gas washing cycles use the property of liquids of absorbing gaseous substances and keeping them in solution without chemically binding the gases in the process. How well a gas is absorbed by a liquid is expressed by the solubility coefficient: the better the gas is dissolved in the liquid, the greater its solubility coefficient. The solubility coefficient is temperature-dependent and generally increases with falling temperatures.

If a gas component i is to be removed from a gas mixture by physical washing, a minimum quantity $W_{min}$ of the liquid that is used as a washing agent is necessary for this purpose, and said minimum quantity can be calculated very readily with the following formula:

$$W_{min} = V/(\rho \cdot \lambda_i).$$

In the formula, V means the total quantity of the gas mixture, $\rho$ means the pressure prevailing in the gas mixture, and $\lambda_I$ means the solubility coefficients of the gas components to be washed out relative to the washing agent that is used. Provided that the solubility coefficients of the components of a gas mixture can be sufficiently greatly distinguished, it is possible by a corresponding adaptation of the quantity of washing agent to separate, i.e., to remove selectively, the gas components with the maximum solubility coefficient largely independently from the other gas components in one washing step. With larger quantities of washing agent, additional gas components or groups of gas components with similar solubility coefficients can be selectively washed out and optionally reused according to the same principle in the following washing steps.

For the purification of raw synthesis gases, which are produced on an industrial scale in gasifier units from carbon or hydrocarbon feedstocks, for example by reforming with water vapor or by partial oxidation, and which generally contain some components that disrupt further processing, such as carbon dioxide ($CO_2$), hydrogen sulfide ($H_2S$) and carbon oxide sulfide (COS), physical washing cycles are preferably used. These processes are attractive since the synthesis gases are currently produced under high pressure in most cases, and in the first approximation, the economic efficiency of physical washing cycles increases linearly with operating pressure. The methanol washing cycle is especially important for the purification of raw synthesis gases. It makes use of the fact that the solubility coefficients of $H_2S$, COS and $CO_2$ in liquid, cryogenic methanol are distinguished by several orders of magnitude from those of hydrogen ($H_2$) and carbon monoxide (CO).

Based on the greatly varying solubility coefficients, in practice the sulfur-containing components $H_2S$ and COS are frequently washed out from the raw synthesis gas in a first washing step and $CO_2$ is washed out from the raw synthesis gas in a second washing step. The quantities of washing agent in both washing steps are adapted to the solubility coefficients of the components that are to be removed, so that in the first washing step, a smaller quantity of washing agent than in the second is used. In the regeneration of the methanol washing agent that is charged in a first washing step, the sulfur-containing components are obtained in pure form to a large extent and can be fed to, for example, a Claus plant for economic use.

According to the prior art, a methanol washing cycle, as it is described above, is carried out in a washing column, in which two washing sections are arranged on top of one another and are separated from one another by a riser base, whereby the first washing step runs in the lower section and the second washing step runs in the upper section. Such a washing column has a device for feeding the raw synthesis gas to be washed into its lower area and a device for draining off the washed synthesis gas at its top. In addition, it has devices for feeding uncharged methanol washing agent to the column head, for draining off $CO_2$-charged methanol washing agent from the riser base, for feeding $CO_2$-charged methanol washing agent into the lower washing section, and for draining off residue from the bottom space. In the first washing section, the sulfur components are removed in the raw synthesis gas before it is passed on into the upper washing section via the riser base, and carbon dioxide is removed there. As washing agent, methanol, which was already charged with $CO_2$ in the upper washing section, is inserted into the lower washing section. The $CO_2$-charged methanol washing agent, which collects in the riser base, is drained off from the latter and divided into a first and a second process stream. The first process stream is regulated by quantity, introduced into the lower washing section, and used there as a washing agent. The second process stream is sent level-controlled to the washing agent regeneration, whereby the filling level in the riser base represents the control variable.

The riser base in the washing column is designed such that at the drain point of the methanol washing agent that is determined in the lower washing section, a static liquid pressure can form that is sufficient to offset the pressure losses, which the methanol washing agent undergoes on its way from the riser base into the lower washing section. Because of the friction losses in the tubing and the pressure losses that are caused by the flow gauge as well as the control fittings, heights of several meters are produced in practice for the riser base. The height of the riser base fits completely into the overall height of the washing column and is therefore responsible for a considerable portion of the investment costs.

The object of this invention is therefore to indicate a washing column of generic type as well as a process for its operation, which, in the case of considerably reduced costs, supplies at least an equal washing result to that of the prior art, and thus to increase the economic efficiency of the gas washing.

This object is achieved on the part of the washing column according to the invention in that the upper washing section is connected to the lower washing section by an overflow, via which charged washing agent from the riser base of the upper washing section can be introduced into the lower washing section.

An overflow is a device for draining liquid from a liquid reservoir, whereby the inflow cross-section of the overflow is made large so that liquid flows off largely friction-free as soon as the liquid level in the liquid reservoir exceeds a boundary value.

Since washing agents drain off almost without friction from the top into the lower washing section, only a very low hydrostatic pressure is necessary to overcome the friction losses at the point of removal of the washing agent in the riser base. In contrast to the prior art, the washing agent level in the riser base extends only slightly above the drain point for the washing agent needed in the lower washing section, i.e., the lower edge of the overflow.

An advantageous configuration of the invention provides that the overflow is designed as a perpendicular pipe that projects with its upper end into the riser base of the upper washing section within the washing column, which connects the riser base to the liquid distributor of the lower washing section.

A preferred embodiment of the washing column according to the invention provides that the purification of raw synthesis gas can be implemented by means of cryogenic methanol therein.

An especially preferred embodiment of the washing column according to the invention provides that exactly two washing sections, separated from one another by a riser base, are arranged in the washing column.

The invention also relates to a process for operating a washing column for implementing a physical gas washing, in which gas is sent from the bottom to the top and washing agent is sent from the top to the bottom through the washing column, whereby at least two washing sections are arranged on top of one another in the washing column, the top section of which is bounded at the bottom by a riser base, from which a portion of the washing agent that is charged in the upper washing section is introduced into the lower washing section as washing agent and another portion is removed via a side drain from the washing column.

On the process side, this object is achieved in that the quantity of washing agent that is directed from the upper washing section into the lower washing section is set indirectly via the quantity of the washing agent that is sent from the washing column via the lateral drain.

In the setting of the quantity of washing agent that is drained off via the lateral drain, it is taken into consideration that washing agent that is introduced at the top of the upper washing section takes a certain amount of time (delay time) to reach the riser base. If, for example, the quantity of the gas that is to be purified increases, the quantity of the washing agent that is introduced into the first washing section is adapted directly to the new operating state by a corresponding increase of the washing agent stream. At the same time, the quantity of the washing agent that is discharged via the lateral drain from the riser base is throttled to the extent that the quantity of washing agent that flows out into the lower washing section also corresponds directly to the new operating state. To the extent that the washing agent stream flows into the riser base from above, the quantity of washing agent that flows out via the lateral drain increases so that the correct quantity of washing agent is introduced into the lower washing section at all times.

A separate adjustment of the washing agent level in the riser base of the upper washing section, as is necessary according to the prior art, is omitted, since this level is determined to a large extent by the overflow according to the invention, independently of the operating conditions of the washing column.

A preferred configuration of the process according to the invention provides that at least carbon dioxide and sulfur components are removed from raw synthesis gas with use of cryogenic methanol as a washing agent.

Thanks to the invention, it is possible to considerably reduce the structural height of a generic washing column in comparison to the prior art. This is to be shown in the example of a washing column with a diameter of 4 m, in which raw synthesis gas is purified with methanol as a washing agent.

To overcome the pressure loss in the lines as well as the pressure loss via the control fittings and the device for flow measurement, a hydrostatic pressure at the drain point of the washing agent that is needed for the lower washing section is necessary according to the prior art, which corresponds to a washing agent height of about 2.8 m. Since the washing agent according to the invention is directed almost without pressure loss from the upper washing section into the lower washing section, the riser base and thus also the washing column can be designed with a structural height that is reduced by this value, which, in the case of a washing column with a diameter of 10 m, results in considerably reduced investment costs.

BRIEF DESCRIPTION OF THE DRAWING

Below, the invention is to be explained in more detail based on an embodiment that is depicted diagrammatically in the Figure.

The embodiment is a washing column in a methanol wash, in which sulfur-containing components and carbon dioxide are removed to a large extent independently of one another from a raw synthesis gas stream in two washing sections.

Via line 1, the raw synthesis gas that is to be purified is introduced into washing column T and then flows upward through the lower washing section WS1. Via the overflow U, methanol washing agent is directed into the lower washing section WS1, in which it is methanol washing agent that is already charged with carbon dioxide in the upper washing section WS2 and which is collected in riser base K, which seals off the washing section WS2 in the downward direction. The methanol washing agent that is charged with carbon dioxide flows into the lower washing section WS1 from the top to the bottom and on its way washes out sulfur-containing components from the raw synthesis gas conveyed in countercurrent flow before it—now charged with $CO_2$ and sulfur-containing components—is collected in the bottom space S of the washing column T. The synthesis gas that is purified by sulfur-containing components flows through the riser base K toward the top in the upper washing section WS2, from which carbon dioxide is removed by methanol washing agent sent in countercurrent flow, which is introduced in uncharged form at the top of the washing column T via line 2. Via line 3, the purified synthesis gas is finally drained off from the washing column T and sent on. The part of the methanol washing agent that is charged in the washing section WS2 with carbon dioxide is drained off from the riser base K via the lateral drain 4 and is fed to a regeneration device (not shown), which is not needed as a washing agent in the lower washing section WS1. The sulfur-containing components are separated largely independently of the carbon dioxide from the methanol washing agent that is drained off from the bottom space S of the washing column T via line 5 and charged, and said components are fed to a Claus plant (not shown) for economic use.

The methanol washing agent is fed—regulated by quantity—to the top of the washing column T via line 2 to ensure that even in varying operating conditions in the upper washing section WS2, the quantity of washing agent needed for optimum separation of the carbon dioxide from the raw synthesis gas is available at each point in time. For this purpose, line 2 is equipped with the quantity-measuring device D1 and the adjusting element a. The flow regulator FC1 gives an adjustment signal to the adjusting element a, whose value is obtained by comparing the signal from the quantity-measuring device D1 to a nominal value, whereby the nominal value, which is based on the quantity of the raw synthesis gas that is to be purified, is set from outside. To ensure that at any point in time the lower washing section WS1 is fed the quantity of washing agent that is required for optimum separation of the sulfur components from the raw synthesis gas, the lateral drain 4 is equipped with a device for quantity adjustment, which consists of the quantity-measuring device D2, the adjusting element b, and the flow regulator FC2. The signal that is emitted by flow regulator FC2 to the adjusting element b is produced from the comparison of the signal of the quantity-measuring device D2 and a nominal value that is set from outside, whose value is obtained according to the quantity of the raw synthesis gas that is to be purified and the amount of time (delay time) that the methanol washing agent needs to reach the top of the washing column T in the riser base K. Via the lateral drain 4, an indirect adjustment of the quantity of washing agent is achieved, which flows into the lower washing section WS1. The level of the charged methanol washing agent in the bottom space S of the washing column T is controlled, and therefore the regulator LC delivers to the adjusting element c a signal whose value depends on the deviation of the current gauge height from a nominal value that is set from outside.

The invention claimed is:

1. A process for operating a washing column for implementing a physical gas washing, said process comprising:
sending gas from the bottom of the washing column to the top of the washing column, and sending washing agent from the top of the washing column to the bottom of the washing column,
wherein at least two washing sections are arranged on top of one another in the washing column, the upper washing section of said at least two washing sections is bounded at the bottom by a riser base, from which a portion of the washing agent that is charged in the upper washing section is introduced into the lower washing section of said at least two washing sections as washing agent, and
another portion of the washing agent is removed from the washing column via a side drain,
wherein the quantity of washing agent that is directed from said upper washing section into said lower washing section is set indirectly via the quantity of washing agent that is sent from the washing column via the side drain, and
wherein said gas is synthesis gas and carbon dioxide and sulfur components are removed from said synthesis gas by said process, and cryogenic methanol is used as said washing agent.

2. A process for operating a washing column for implementing a physical gas washing, said process comprising:
sending a gas from the bottom to the top of a washing column, and sending a washing agent from the top to the bottom of said washing column, wherein said washing column comprises at least two washing sections arranged on top of one another, the top washing section is bounded at the bottom by a riser base, from which a portion of the washing agent introduced into said top washing section is introduced into the lower washing section and another portion of the washing agent is removed from the washing column via a side drain,
wherein the quantity of washing agent is directed from said top washing section into said lower washing section is set indirectly via the quantity of washing agent sent from the washing column via said lateral drain, and
wherein cryogenic methanol as used as said washing agent, and synthesis gas is used as said gas, and wherein at least carbon dioxide, and sulfur components are removed from said synthesis gas in said washing column.

3. The process according to claim 2, wherein said top washing section is connected to said lower washing section by an overflow, and washing agent from the riser base of said top washing section is introduced into said lower washing section via said overflow.

4. The process according to claim 3, wherein said overflow is designed as a perpendicular pipe that projects with its upper end into said riser base of said top washing section within said washing column, which connects the riser base to the liquid distributor of the lower washing section.

5. The process according to claim 2, wherein exactly two washing sections, separated from one another by said riser base, are arranged in said washing column.

6. The process according to claim 2, wherein said another portion of the washing agent removed via said side drain is sent to regeneration.

7. The process according to claim 2, wherein
said washing agent is introduced into said top washing section via a line that comprises a first quantity-measuring device (D1), a first adjusting element (a), and a first flow regulator (FC1), and said first flow regulator (FC1) sends adjustment signals to said first adjusting element (a), wherein the values of the adjustment signals sent to said first adjusting element (a) are obtained by comparing signals sent from said first quantity-measuring device (D1) to said first flow regulator (FC1) to a nominal value based on the quantity of gas that is to be purified; and
said lateral drain comprises a second quantity-measuring device (D2), a second adjusting element (b), and a second flow regulator (FC2), and said second flow regulator (FC2) sends adjustment signals to said second adjusting element (b), wherein the values of the adjustment signals sent to said second adjusting element (b) are obtained by comparing signals sent form said second quantity-measuring device (D2) to said second flow regulator (FC2) to a nominal value based on the quantity of gas that is to be purified and the amount of time that the washing agent needs to reach the top of the washing column in the riser base.

8. The process according to claim 7, further comprising controlling the level of washing agent in the bottom space (S) of said washing column by a removal line that includes a third flow regulator (LC) that delivers signals to a third adjusting element (c) wherein the value of the signal from said third flow regulator (LC) is based on the deviation of current gauge height of washing agent in said bottom space (S) from a set nominal value.

* * * * *